United States Patent
Kimura (10) Patent No.: US 12,196,026 B2
(45) Date of Patent: Jan. 14, 2025

(54) OPENING AND CLOSING BODY CONTROL DEVICE FOR VEHICLE

(71) Applicant: AISIN CORPORATION, Aichi (JP)

(72) Inventor: Shogo Kimura, Kariya (JP)

(73) Assignee: AISIN CORPORATION, Kariya (JP)

( * ) Notice: Subject to any disclaimer, the term of this patent is extended or adjusted under 35 U.S.C. 154(b) by 1222 days.

(21) Appl. No.: 16/816,314

(22) Filed: Mar. 12, 2020

(65) Prior Publication Data

US 2020/0291708 A1 Sep. 17, 2020

(30) Foreign Application Priority Data

Mar. 15, 2019 (JP) .................................. 2019-048208

(51) Int. Cl.
| | |
|---|---|
| *E05F 15/40* | (2015.01) |
| *B60J 5/00* | (2006.01) |
| *B60J 5/10* | (2006.01) |
| *E05F 15/43* | (2015.01) |

(52) U.S. Cl.
CPC .................. *E05F 15/40* (2015.01); *B60J 5/00* (2013.01); *B60J 5/10* (2013.01); *E05F 2015/433* (2015.01); *E05Y 2400/36* (2013.01)

(58) Field of Classification Search
CPC ................ E05F 15/40; E05F 2015/433; E05F 2015/432; E05F 2015/483; E05F 15/43
See application file for complete search history.

(56) References Cited

U.S. PATENT DOCUMENTS

| | | | |
|---|---|---|---|
| 6,542,071 B1 * | 4/2003 | Ohtsubo | ............ G07C 9/00309 |
| | | | 340/505 |
| 7,688,013 B2 * | 3/2010 | Frommer | ................ E05F 15/73 |
| | | | 318/266 |
| 11,225,822 B2 | 1/2022 | Partsch et al. | |

(Continued)

FOREIGN PATENT DOCUMENTS

| | | |
|---|---|---|
| CN | 108350716 A | 7/2018 |
| DE | 10 2015 005 361 A1 | 12/2015 |

(Continued)

OTHER PUBLICATIONS

Office Action issued Oct. 18, 2022, in corresponding Japanese Patent Application No. 2019-048208 (with English Translation), 8 pages.

*Primary Examiner* — Adam R Mott
*Assistant Examiner* — Ricardo I Viscarra
(74) *Attorney, Agent, or Firm* — Oblon, McClelland, Maier & Neustadt, L.L.P.

(57) ABSTRACT

An opening and closing body control device for a vehicle includes: a control unit configured to control an opening and closing body drive device driving an opening and closing body of a vehicle to open and close the opening and closing body based on an operation request; and a detection unit configured to detect an obstacle present around the opening and closing body based on a detection result of an obstacle sensor. The control unit sets an operation speed of the opening and closing body to a first speed when the obstacle is not detected during an operation of the opening and closing body, and sets the operation speed to a second speed or less and causes the opening and closing body to stop at a position where the opening and closing body is close to the obstacle, when the obstacle is detected during the operation.

5 Claims, 7 Drawing Sheets

(56) References Cited

U.S. PATENT DOCUMENTS

| | | | | |
|---|---|---|---|---|
| 2007/0266635 A1* | 11/2007 | Sugiura | ................ | E05F 15/632 |
| | | | | 49/27 |
| 2007/0296242 A1* | 12/2007 | Frommer | .............. | E05F 15/616 |
| | | | | 296/146.4 |
| 2017/0241182 A1* | 8/2017 | Hung | ...................... | E05F 15/46 |
| 2017/0268280 A1* | 9/2017 | Kim | ...................... | B60W 30/08 |
| 2018/0321758 A1* | 11/2018 | Serban | ................. | G06F 3/0325 |
| 2022/0243521 A1* | 8/2022 | Herman | ................ | E05F 15/622 |

FOREIGN PATENT DOCUMENTS

| | | |
|---|---|---|
| FR | 2 936 997 A1 | 4/2010 |
| JP | 2005-256529 A | 9/2005 |
| JP | 2009-108556 A | 5/2009 |
| JP | 2009-256906 A | 11/2009 |

\* cited by examiner

OPENING AND CLOSING BODY CONTROL DEVICE FOR VEHICLE

CROSS REFERENCE TO RELATED APPLICATIONS

This application is based on and claims priority under 35 U.S.C. § 119 to Japanese Patent Application 2019-048208, filed on Mar. 15, 2019, the entire contents of which are incorporated herein by reference.

TECHNICAL FIELD

This disclosure relates to an opening and closing body control device for a vehicle.

BACKGROUND DISCUSSION

JP 2009-108556A (Reference 1) discloses a vehicle including a back door that is operated by a motor, obstacle sensors provided on an outer surface of the back door, and a door control device that controls an operation of the back door. When the obstacle sensors detect that the back door is close to an obstacle during an opening operation of the back door, the door control device stops the back door. Thus, the door control device prevents the back door from coming into contact with the obstacle.

In the door control device as described above, when a timing to stop the back door is late, the back door may come into contact with the obstacle. On the other hand, when the timing to stop the back door is early, a convenience of a user may be reduced in that the back door stops at a position far away from the obstacle. For this reason, it is desired to improve a positional accuracy when the door control device as described above stops the back door.

Such a situation is not limited to the door control device that controls the operation of the back door, but is generally common to an opening and closing body control device for a vehicle that controls an operation of an opening and closing body such as a power slide door. Thus, a need exists for an opening and closing body control device for a vehicle which is not susceptible to the drawback mentioned above.

SUMMARY

Hereinafter, means for solving the above problems and effects thereof are described.

An opening and closing body control device for a vehicle includes a control unit configured to control an opening and closing body drive device driving an opening and closing body of a vehicle to open and close the opening and closing body based on an operation request; and a detection unit configured to detect an obstacle present around the opening and closing body based on a detection result of an obstacle sensor. The control unit is configured to set an operation speed of the opening and closing body to a first speed when the obstacle is not detected during an operation of the opening and closing body, and set the operation speed of the opening and closing body to a second speed or less, the second speed being lower than the first speed, and causes the opening and closing body to stop at a position where the opening and closing body is close to the obstacle, when the obstacle is detected during the operation of the opening and closing body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a vehicle including an opening and closing body control device for a vehicle is described with reference to the drawings.

Figure 1:
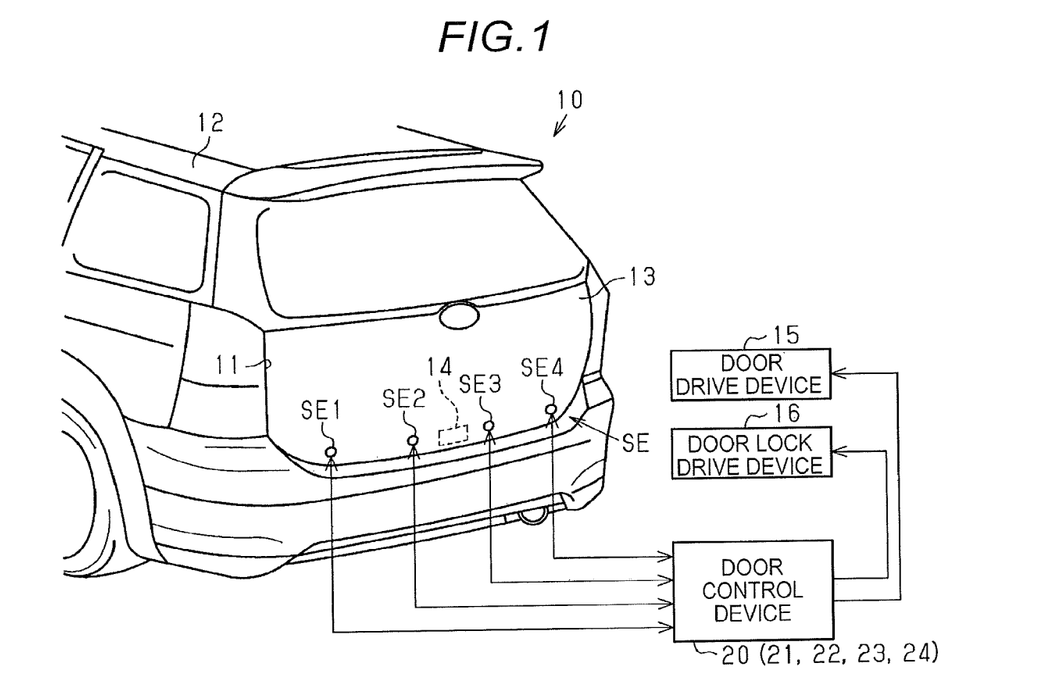
FIG. 1 is a perspective view of a rear portion of a vehicle.

As shown in FIG. 1, a vehicle 10 includes a vehicle body 12 in which a door opening 11 is formed in a rear portion, a back door 13 that opens and closes the door opening 11, and a door lock device 14 that restrains the back door 13 on the vehicle body 12. The vehicle 10 includes a door drive device 15 that drives the back door 13, a door lock drive device 16 that drives the door lock device 14, and a door control device 20 that controls the door drive device 15 and the door lock drive device 16.

In this embodiment, the back door 13 corresponds to an example of an "opening and closing body", the door drive device 15 corresponds to an example of an "opening and closing body drive device", and the door control device 20 corresponds to an example of an "opening and closing body control device".

The door opening 11 opens in a rear direction of the vehicle 10. The door opening 11 has a substantially rectangular shape in which a width direction of the vehicle 10 is a longitudinal direction and an up and down direction of the vehicle 10 is a short-side direction. The door opening 11 is an opening for opening a luggage compartment of the vehicle 10 to an outside of the vehicle. A weather strip (not shown) is disposed along an opening edge of the door opening 11.

The back door 13 is formed in a shape capable of closing the door opening 11. The back door 13 is rotatably supported on an upper portion of the door opening 11. A rotation axis of the back door 13 extends in the width direction of the vehicle 10. Thus, the back door 13 rotates between a fully closed position where the door opening 11 is fully closed and a fully open position where the door opening 11 is fully opened.

A plurality of obstacle sensors SE is provided at a lower end of the back door 13. In the embodiment, four obstacle sensors SE1 to SE4 are disposed side by side in the width direction of the vehicle 10. The obstacle sensors SE detect reflected waves of ultrasonic waves transmitted in a direction intersecting with an outer surface of the back door 13. When the back door 13 is disposed at the fully closed position, a detection range of the obstacle sensors SE is a region behind the back door 13. The obstacle sensors SE preferably have a performance of being able to detect an obstacle 30 that is several centimeters to several meters away. Further, the obstacle 30 in the embodiment includes a vehicle different from a host vehicle, a wall and a fence of such as a building and a garage, and a person or an animal in a vicinity of the vehicle 10.

The door drive device 15 is, for example, an actuator that expands and contracts by driving of a motor (not shown). A base end portion of the door drive device 15 is coupled to the vehicle body 12 rotatably about an axis extending in the width direction of the vehicle 10, and a tip end portion of the door drive device 15 is coupled to the back door 13 rotatably about the axis extending in the width direction of the vehicle 10. Thus, the door drive device 15 opens the back door 13 by expanding. On the other hand, the door drive device 15 closes the back door 13 by contracting.

The door lock device 14 is switched between a restraint state in which the back door 13 located at the fully closed position is restrained to the vehicle body 12 and a release state in which the restraint of the back door 13 located at the fully closed position with respect to the vehicle body 12 is released. In the following description, changing a state in which the door lock device 14 does not restrict the back door 13 to the vehicle body 12 to a state in which the back door 13 is restricted to the vehicle body 12 is also referred to as a "latch operation", and changing a state in which the door lock device 14 restricts the back door 13 to the vehicle body 12 to a state in which the back door 13 is not restricted to the vehicle body 12 is also referred to as an "unlatch operation". The door lock drive device 16 unlatches the door lock device 14 by driving the motor (not shown).

Next, the door control device 20 is described in detail.

The door control device 20 includes a detection unit 21 that detects the obstacle 30 present around the back door 13, a calculation unit 22 that calculates a distance from the back door 13 to the obstacle 30, a setting unit 23 that sets a range in which the back door 13 can be opened, and a control unit 24 that controls the door drive device 15 and the door lock drive device 16.

The detection unit 21 detects the obstacle 30 based on detection results of the obstacle sensors SE. The detection unit 21 continuously acquires the detection results of the obstacle sensors SE in a predetermined control cycle. For example, the detection unit 21 repeatedly acquires the detection results of the obstacle sensors SE not only before an opening operation of the back door 13 is started but also during the opening operation of the back door 13.

Figure 2:
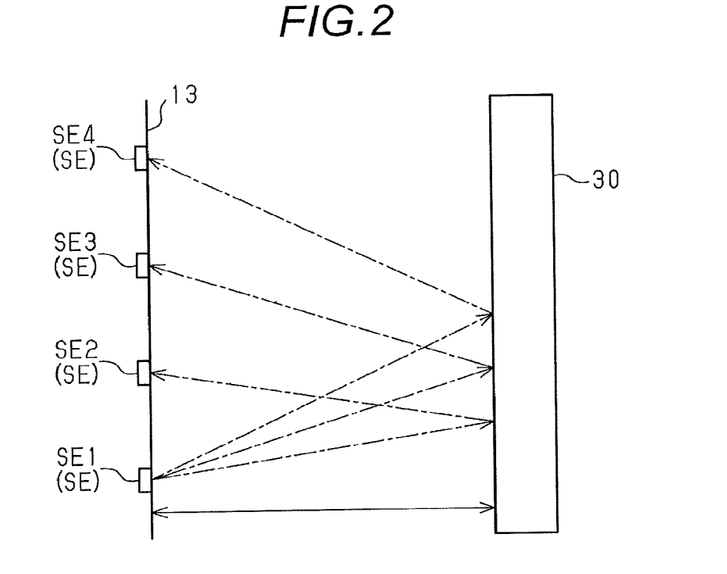
FIG. 2 is a top view illustrating a detecting method implemented by obstacle sensors.

As shown in FIG. 2, the detection unit 21 causes one obstacle sensor SE among the plurality of obstacle sensors SE to function as a transmitter, and causes the other three obstacle sensors SE to function as receivers. Hereinafter, an obstacle detection method when a first obstacle sensor SE1 is set as the transmitter and a second obstacle sensor SE2, a third obstacle sensor SE3, and a fourth obstacle sensor SE4 are set as the receivers in a situation where the back door 13 is located at the fully closed position is to be described.

When the obstacle 30 is not present behind the back door 13, ultrasonic waves transmitted from the first obstacle sensor SE1 are not reflected. That is, the second obstacle sensor SE2, the third obstacle sensor SE3, and the fourth obstacle sensor SE4 do not receive the reflected waves of the ultrasonic waves transmitted from the first obstacle sensor SE1. In this case, based on the detection results of the second obstacle sensor SE2, the third obstacle sensor SE3, and the fourth obstacle sensor SE4, the detection unit 21 can detect that the obstacle 30 is not present behind the back door 13.

On the other hand, when the obstacle 30 is present behind the back door 13, the ultrasonic waves transmitted from the first obstacle sensor SE1 are reflected by the obstacle 30. That is, the second obstacle sensor SE2, the third obstacle sensor SE3, and the fourth obstacle sensor SE4 receive the reflected waves of the ultrasonic waves transmitted from the first obstacle sensor SE1. In this case, based on the detection results of the second obstacle sensor SE2, the third obstacle sensor SE3, and the fourth obstacle sensor SE4, the detection unit 21 can detect that the obstacle 30 is present behind the back door 13.

As an example, when an intensity of the reflected waves received by the second obstacle sensor SE2, the third obstacle sensor SE3, and the fourth obstacle sensor SE4 is equal to or greater than a predetermined threshold, the detection unit 21 may determine that the obstacle 30 is present behind the back door 13.

In the obstacle detection method described above, the first obstacle sensor SE1 is set as the transmitter, the second obstacle sensor SE2, the third obstacle sensor SE3, and the fourth obstacle sensor SE4 are set as the receivers, but an obstacle sensor SE different from the first obstacle sensor SE1 may be set as the transmitter, and the other obstacle sensors SE may be set as the receivers. The detection unit 21 may perform the obstacle detection while changing a combination of the obstacle sensor SE serving as the transmitter and the obstacle sensors SE serving as the receivers. When the obstacle detection is performed by switching the obstacle sensors SE serving as the transmitter and the receivers, an accuracy of the obstacle detection is improved.

In the following description, among obstacles 30 to be detected by the detection unit 21, the obstacle 30 detected before the opening operation of the back door 13 disposed in the fully closed position is started is also referred to as a "first obstacle", and the obstacle 30 detected after the opening operation of the back door 13 is started is also referred to as a "second obstacle".

When the obstacle 30 is detected behind the back door 13, the calculation unit 22 calculates a distance from the back door 13 to the obstacle 30. As shown in FIG. 2, when the second obstacle sensor SE2 detects a reflected wave of an ultrasonic wave transmitted from the first obstacle sensor SE1, a distance from the back door 13 to the obstacle 30 is calculated according to time from when the first obstacle sensor SE1 transmits the ultrasonic wave to when the second obstacle sensor SE2 receives the reflected wave. In this embodiment, the "distance from the back door 13 to the obstacle 30" is a distance indicated by a dimension line in FIG. 2, and is a distance in a front-rear direction of the vehicle 10 from an installation location of the obstacle sensor SE in the back door 13 to the obstacle 30. In the following description, the distance from the back door 13 to the obstacle 30 calculated by the calculation unit 22 is also referred to as a "measurement distance".

When a first obstacle is detected behind the back door 13, the setting unit 23 sets a "target stop position" which is a position for opening the back door 13 in a range in which the back door 13 does not contact the first obstacle. The target stop position is a position of the back door 13 when a distance from the back door 13 to the first obstacle is a "first determination distance Dth1" indicating that the first obstacle is close. The target stop position may be geometrically determined based on the distance from the back door 13 to the first obstacle and a turning radius of the back door 13. The setting unit 23 may manage the target stop position as an opening degree of the back door 13 based on the fully closed position. The first determination distance Dth1 may be a variable value appropriately set by a user, or may be a preset fixed value. As an example, the first determination distance Dth1 may be set to a distance of about 50 mm.

When an operation request of the back door 13 is input, the control unit 24 causes the back door 13 to open and close. The operation request is a signal input to the door control device 20 when the user operates a switch provided in vicinity of a driver seat or on the back door 13, or when the user operates a button provided on an electronic key.

Figure 3:
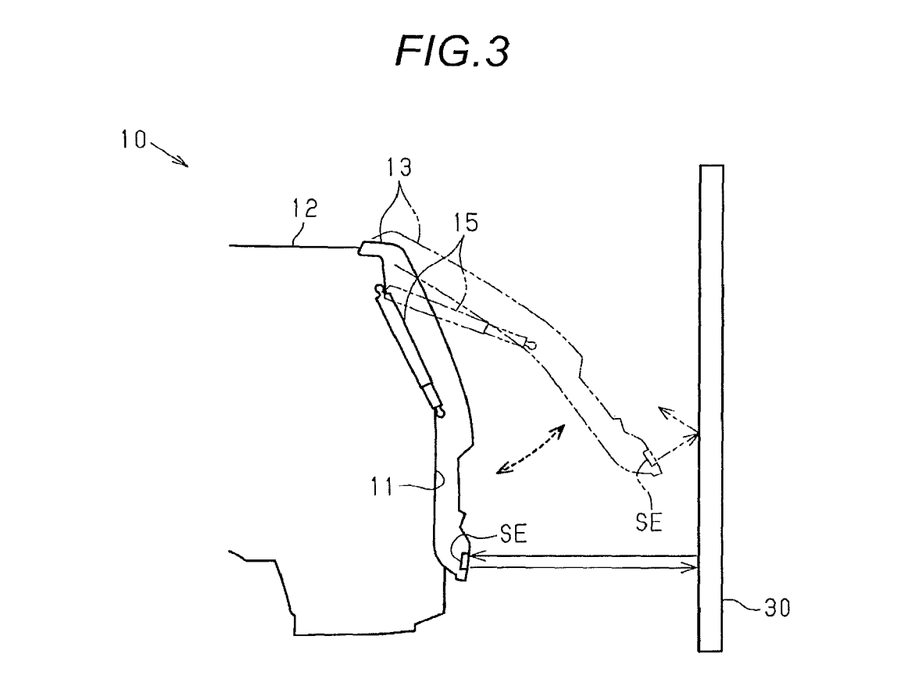
FIG. 3 is a side view illustrating the detecting method implemented by the obstacle sensors when an opening degree of a back door changes.

Here, as shown in FIG. 3, when the detection unit 21 detects the obstacle 30 based on a detection result of the ultrasonic wave reflected by the obstacle 30, the following problem arises. Specifically, as indicated by a solid line in FIG. 3, when the back door 13 is located at the fully closed position, the detection unit 21 can detect the first obstacle based on the detection result of the ultrasonic wave reflected normally. However, as indicated by a two-dot chain line in FIG. 3, when the opening degree of the back door 13 increases, the detection unit 21 may not be able to detect the first obstacle since a reflection direction of the ultrasonic wave does not face the obstacle sensors SE. In other words, the detection unit 21 may lose sight of the first obstacle, which can be detected when the opening degree of the back door 13 is small, since the opening degree of the back door 13 increases.

Therefore, in this embodiment, when the operation request for opening the back door 13 is input in a situation where the target stop position is set, the control unit 24 causes the back door 13 to open toward the target stop position. Therefore, even when the first obstacle is not detected, the control unit 24 can cause the back door 13 to open toward the target stop position which is a position in front of the first obstacle.

When a second obstacle closer to the back door 13 than the first obstacle is detected while the back door 13 is being opened toward the target stop position, the control unit 24 stops the back door 13 at a position in front of the second obstacle. Specifically, when a distance from the back door 13 to the second obstacle is the first determination distance Dth1, the control unit 24 stops the back door 13.

On the other hand, when the operation request for opening the back door 13 is input in a situation where the target stop position is not set, the control unit 24 causes the back door 13 to open toward the fully open position. In this case, when the second obstacle is detected during the opening operation of the back door 13, the control unit 24 also stops the back door 13 at the position in front of the second obstacle.

Further, the control unit 24 changes an opening speed as an operation speed of the back door 13 depending on whether or not the obstacle 30 is detected. In this embodiment, the opening speed of the back door 13 is a moving speed of a tip end portion of the back door 13. When the obstacle 30 is not detected, the control unit 24 sets the opening speed of the back door 13 to a first speed V1 that is a relatively high. On the other hand, when the obstacle 30 is detected, the control unit 24 sets the opening speed of the back door 13 to a second speed V2 lower than the first speed V1 or less. As an example, the first speed V1 may be 300 to 400 mm/sec, and the second speed V2 may be 100 to 200 mm/sec.

Figure 4:
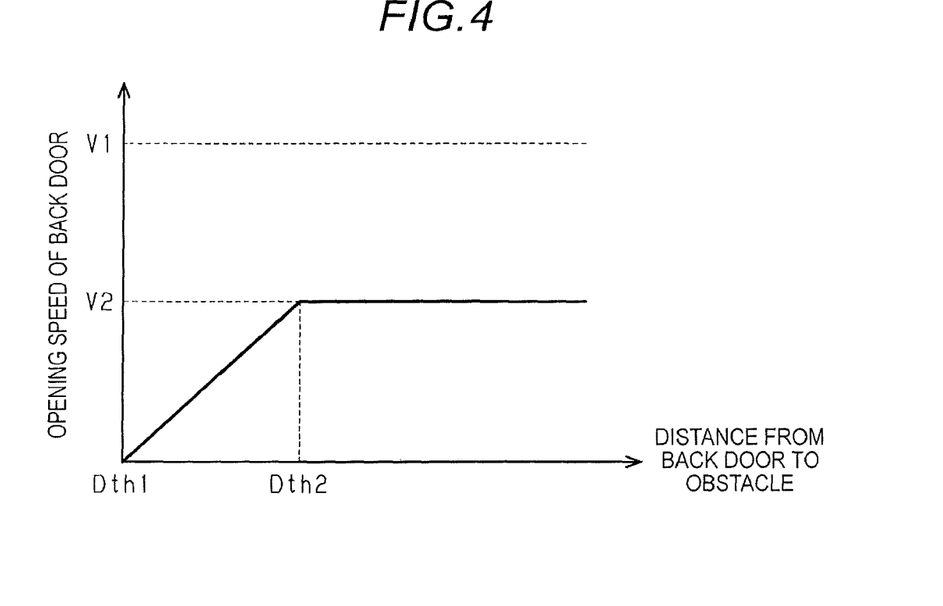
FIG. 4 is a map for setting an opening speed of the back door.

FIG. 4 is a map for setting the opening speed of the back door 13 when the obstacle 30 is detected. In the map shown in FIG. 4, a horizontal axis indicates the distance from the back door 13 to the obstacle 30, and a vertical axis indicates the opening speed of the back door 13. When the distance from the back door 13 to the obstacle 30 is equal to or greater than a second determination distance Dth2, the opening speed of the back door 13 is set to the second speed V2 less than the first speed V1. When the distance from the back door 13 to the obstacle 30 is less than the second determination distance Dth2, the opening speed of the back door 13 is gradually reduced as the distance decreases.

In the map shown in FIG. 4, when the distance from the back door 13 to the obstacle 30 is the first determination distance Dth1, the opening speed of the back door 13 is "0", but when the distance from the back door 13 to the obstacle 30 is the first determination distance Dth1, the opening speed of the back door 13 may be less than the second speed V2 and greater than "0". The obstacle 30 mentioned here includes both the first obstacle and the second obstacle. That is, when the first obstacle is detected, the control unit 24 sets the opening speed of the back door 13 to the second speed V2 or less from a timing at which the opening operation of the back door 13 is started. On the other hand, when the second obstacle is detected during the opening operation of the back door 13, the control unit 24 sets the opening speed of the back door 13 to the second speed V2 or less from a timing at which the second obstacle is detected.

Figure 5:
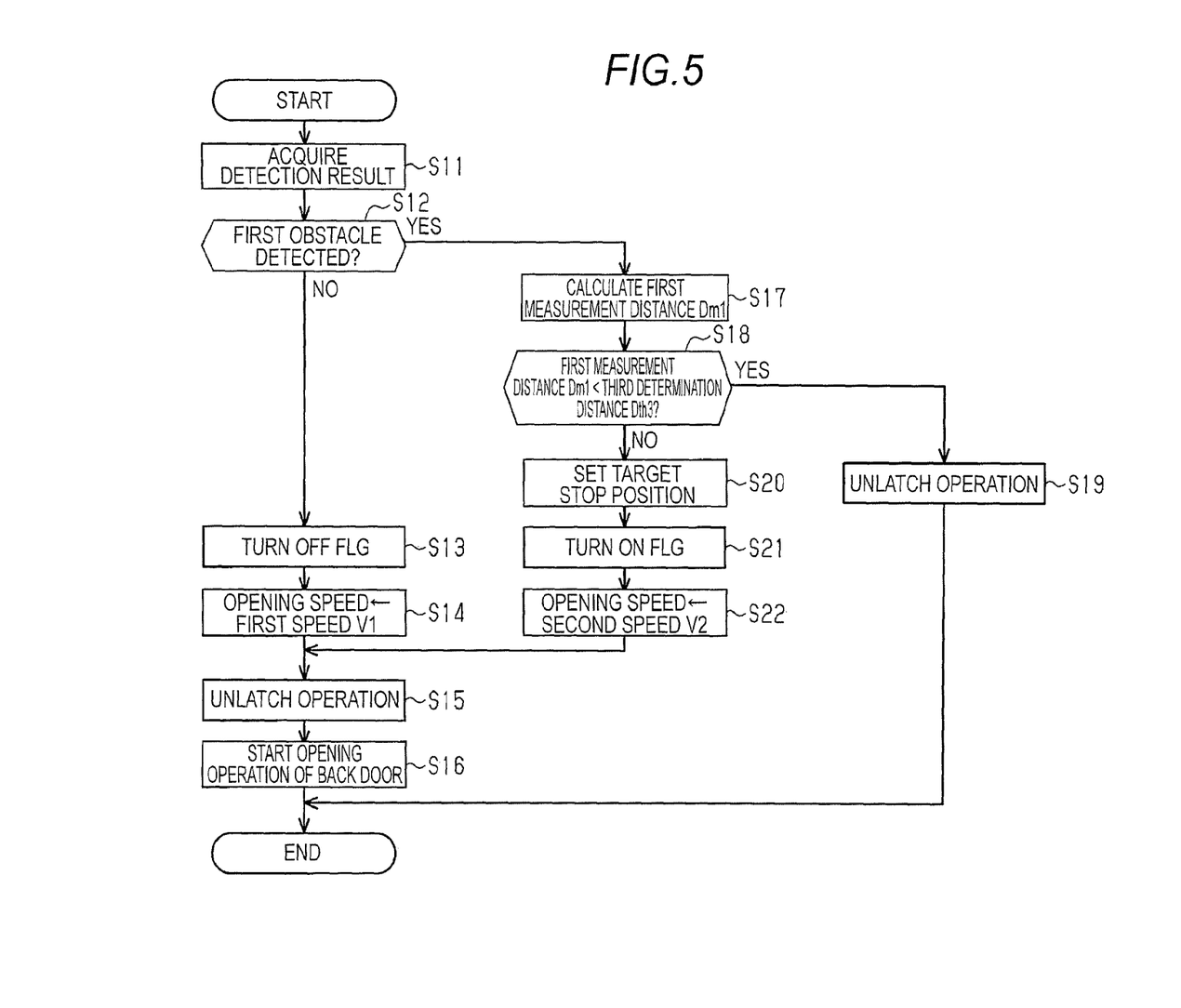
FIG. 5 is a flowchart showing a flow of processing executed by a door control device when starting an opening operation of the back door.

Next, with reference to a flowchart shown in FIG. 5, a flow of processing executed by the door control device 20, when the operation request for opening the back door 13 is input in a situation where the back door 13 is disposed at the fully closed position, is to be described.

As shown in FIG. 5, when the operation request for opening the back door 13 is input, the door control device 20 acquires the detection results of the obstacle sensors SE (step S11). Subsequently, based on the detection results of the obstacle sensors SE, the door control device 20 determines that whether or not the first obstacle is detected behind the back door 13 (step S12). When the first obstacle is not detected (step S12: NO), the door control device 20 turns off a flag FLG (step S13). The flag FLG is a flag indicating whether or not the first obstacle is detected behind the back door 13. When the first obstacle is detected behind the back door 13, the flag FLG is turned on, and when the first obstacle is not detected behind the back door 13, the flag FLG is turned off.

After setting the flag FLG, the door control device 20 sets the opening speed of the back door 13 to the first speed V1 that is relatively high (step S14). Then, the door control device 20 controls the door lock drive device 16 to unlatch the door lock device 14 (step S15). Subsequently, the door control device 20 controls the door drive device 15 to start the opening operation of the back door 13 (step S16). Thereafter, the door control device 20 ends the processing.

In step S12, when the first obstacle is detected behind the back door 13 (step S12: YES), the door control device 20 calculates a first measurement distance Dm1 which is a measurement distance from the back door 13 to the first obstacle (step S17). Subsequently, the door control device 20 determines whether or not the first measurement distance Dm1 is less than a third determination distance Dth3 (step S18). The third determination distance Dth3 is a distance for determining whether or not the distance from the back door 13 to the first obstacle is very short. As an example, the third determination distance Dth3 is set to a length of about 400 mm.

When the first measurement distance Dm1 is less than the third determination distance Dth3 (step S18: YES), the door control device 20 controls the door lock drive device 16 to unlatch the door lock device 14 (step S19). Thereafter, the door control device 20 ends the processing. Here, when the measurement distance is less than the third determination distance Dth3, even if the back door 13 is opened to the target stop position, the opening degree of the back door 13 can be only an opening degree at which a luggage cannot be loaded and unloaded. Therefore, when there is no point in opening the back door 13, the door control device 20 restricts the opening operation of the back door 13. On the other hand, for a purpose of notifying the user that an operation request from the user is input, the door control device 20 unlatches the door lock device 14.

When the first measurement distance Dm1 is equal to or greater than the third determination distance Dth3 (step S18: NO), the door control device 20 sets the target stop position for stopping the back door 13 in front of the first obstacle (step S20). Then, the door control device 20 turns on the flag FLG (step S21), and sets the opening speed of the back door 13 to the second speed V2 at a relatively low speed (step S22). After setting the speed of the back door 13, the door control device 20 proceeds the processing to step S15.

According to the flowchart shown in FIG. 5, whether when the first measurement distance Dm1 is equal to or greater than the third determination distance Dth3, or when the first measurement distance Dm1 is less than the third determination distance Dth3, the door control device 20 unlatches the door lock device 14 (steps S15 and S19). In this regard, it can be said that when there is an operation request, the door control device 20 releases the restraint of the back door 13 by the door lock device 14 regardless of the first measurement distance Dm1 which is the measurement distance from the back door 13 to the first obstacle.

On the other hand, the door control device 20 restricts the opening operation of the back door 13 when the first measurement distance Dm1 is less than the third determination distance Dth3, and permits the opening operation of the back door 13 when the first measurement distance Dm1 is equal to or greater than the third determination distance Dth3 (step S16). In this regard, it can be said that the door control device 20 restricts the opening operation of the back door 13 when the first measurement distance Dm1 is short, and permits the opening operation of the back door 13 when the first measurement distance Dm1 is long.

Figure 6:
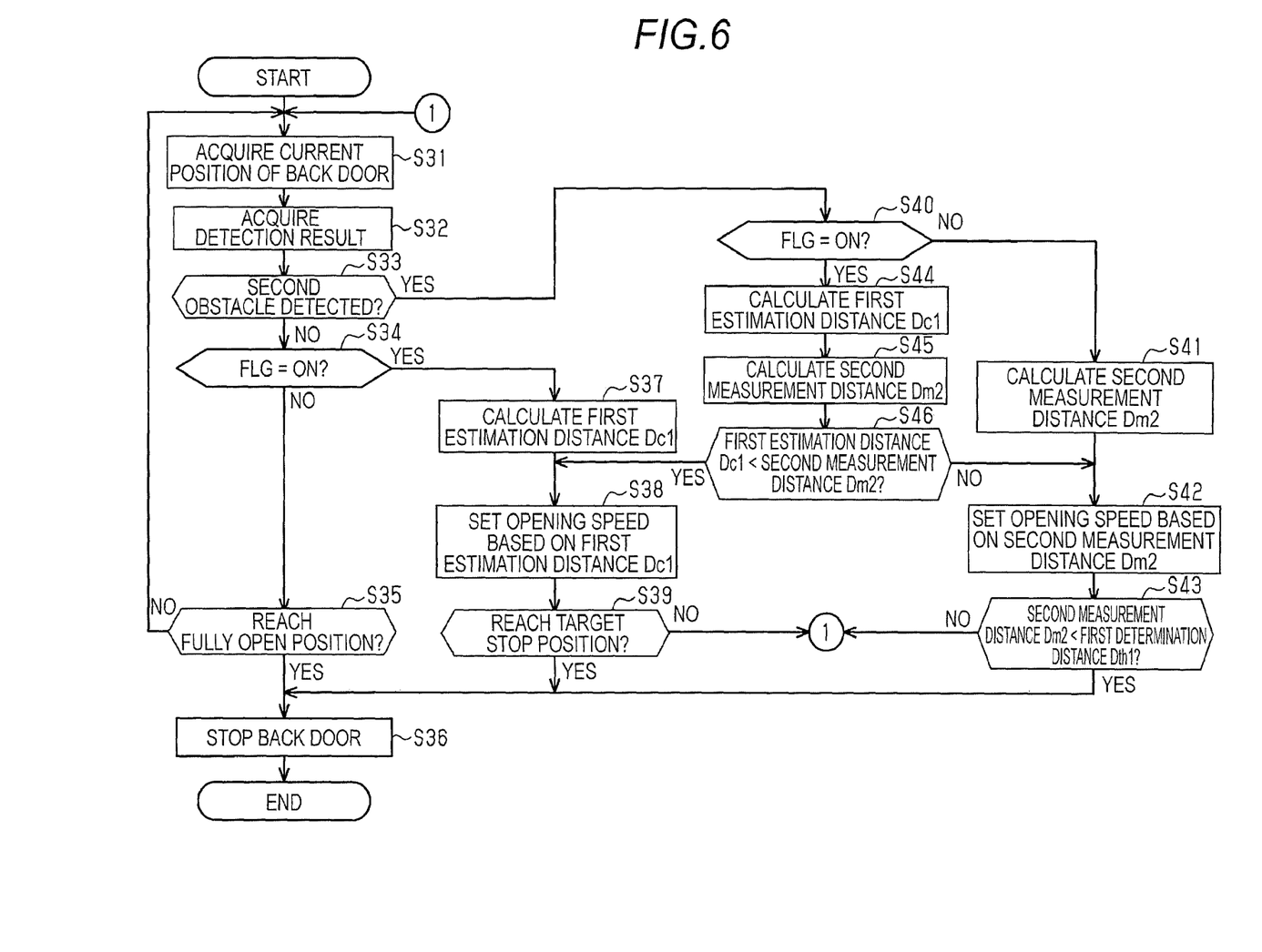
FIG. 6 is a flowchart showing a flow of processing executed by the door control device during the opening operation of the back door.

Next, with reference to a flowchart shown in FIG. 6, a flow of a processing executed by the door control device 20 during the opening operation of the back door 13 is to be described.

As shown in FIG. 6, the door control device 20 acquires a current position of the back door 13 based on a movement amount of the back door 13 after the opening operation of the back door 13 is started (step S31). Subsequently, the door control device 20 acquires the detection results of the obstacle sensors SE (step S32), and determines that whether or not the second obstacle different from the first obstacle is detected behind the back door 13 based on the detection results of the obstacle sensors SE (step S33). When the second obstacle is not detected (step S33: NO), the door control device 20 determines that whether or not the flag FLG is ON (step S34).

When the flag FLG is OFF (step S34: NO), that is, when the first obstacle is not detected when the opening operation of the back door 13 is started, the door control device 20 determines that whether or not the back door 13 reaches the fully open position (step S35). When the back door 13 does not reach the fully open position (step S35: NO), the door control device 20 proceeds to step S31. On the other hand, when the back door 13 reaches the fully open position (step S35: YES), the door control device 20 controls the door drive device 15 to stop the back door 13 (step S36). Thereafter, the door control device 20 ends the processing.

In step S34, when the flag FLG is ON (step S34: YES), that is, when the first obstacle is detected when the opening operation of the back door 13 is started, the door control device 20 calculates a "first estimation distance Dc1" which is the distance from the back door 13 to the first obstacle based on the current position of the back door 13 (step S37). The first estimation distance Dc1 is geometrically calculated based on the first measurement distance Dm1 before the operation of the back door 13 is started and the current position of the back door 13.

Then, the door control device 20 sets the opening speed of the back door 13 with reference to the map shown in FIG. 4 (step S38). The distance from the back door 13 to the first obstacle used in the setting of the opening speed of the back door 13 is not the first measurement distance Dm1 calculated based on the detection results of the obstacle sensors SE but is the first estimation distance Dc1 calculated in step S37. Thus, when the obstacle sensors SE cannot detect the first obstacle, the opening speed is prevented from being set in accordance with an erroneous first measurement distance Dm1.

Then, the door control device 20 determines that whether or not the back door 13 reaches the target stop position (step S39). When the back door 13 does not reach the target stop position (step S39: NO), the door control device 20 proceeds to step S31. On the other hand, when the back door 13 reaches the target stop position (step S39: YES), the door control device 20 proceeds to step S36.

In step S33, when the second obstacle is detected (step S33: YES), the door control device 20 determines that whether or not the flag FLG is on (step S40). When the flag FLG is off (step S40: NO), that is, when the first obstacle is not detected when the opening operation of the back door 13 is started, the door control device 20 calculates a second measurement distance Dm2 which is a measurement distance from the back door 13 to the second obstacle (step S41). Subsequently, the door control device 20 sets the opening speed of the back door 13 according to the second measurement distance Dm2 with reference to the map shown in FIG. 4 (step S42).

Then, the door control device 20 determines that whether or not the second measurement distance Dm2 is less than the first determination distance Dth1 (step S43). When the measurement distance from the back door 13 to the second obstacle is equal to or greater than the first determination distance Dth1 (step S43: NO), that is, when the back door 13 is not close to the second obstacle, the door control device 20 proceeds to step S31. On the other hand, when the measurement distance from the back door 13 to the second obstacle is less than the first determination distance Dth1 (step S43: YES), that is, when the back door 13 is close to the second obstacle, the door control device 20 proceeds to step S36.

In step S40, when the flag FLG is ON (step S40: YES), that is, when the first obstacle is detected when the opening operation of the back door 13 is started, the door control device 20 calculates the first estimation distance Dc1 (step S44) and calculates the second measurement distance Dm2 (step S45). Subsequently, the door control device 20 determines that whether or not the first estimation distance Dc1 is less than the second measurement distance Dm2 (step S46).

When the first estimation distance Dc1 is less than the second measurement distance Dm2 (step S46: YES), that is, when the first obstacle is located closer than the second obstacle when viewed from the back door 13, the door control device 20 proceeds to step S38. On the other hand, when the first estimation distance Dc1 is equal to or greater than the second measurement distance Dm2 (step S46: NO), that is, when the second obstacle is located closer than the first obstacle when viewed from the back door 13, the door control device 20 proceeds to step S42. Thus, according to a determination in step S46, an opening speed is set according to a distance from the back door 13 to a closer obstacle of the first obstacle and the second obstacle.

Effects of this embodiment are to be described.

Figure 7:
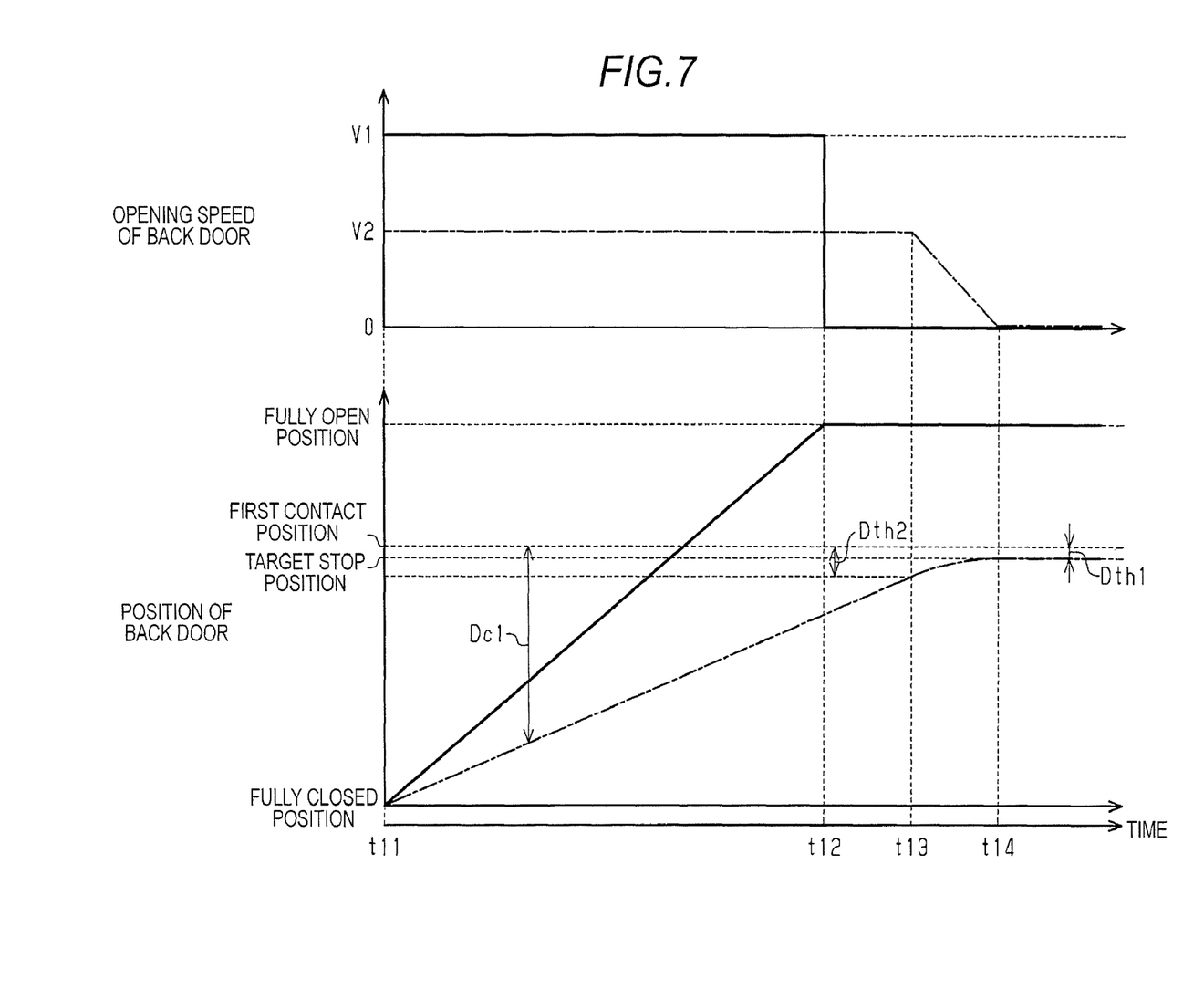
FIG. 7 is a timing chart illustrating an effect of the door control device.
Figure 8:
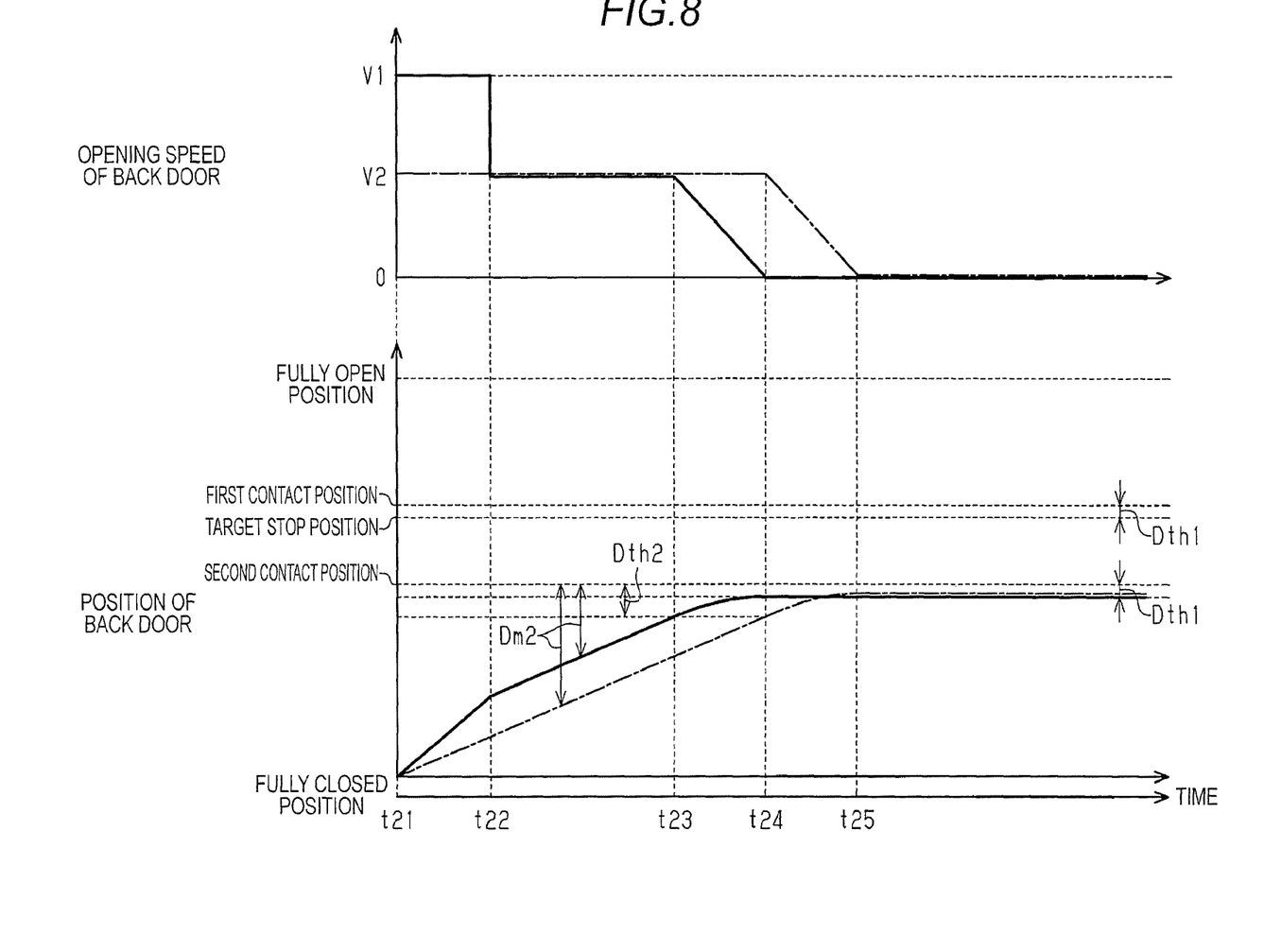
FIG. 8 is a timing chart illustrating the effect of the door control device.
Figure 9:
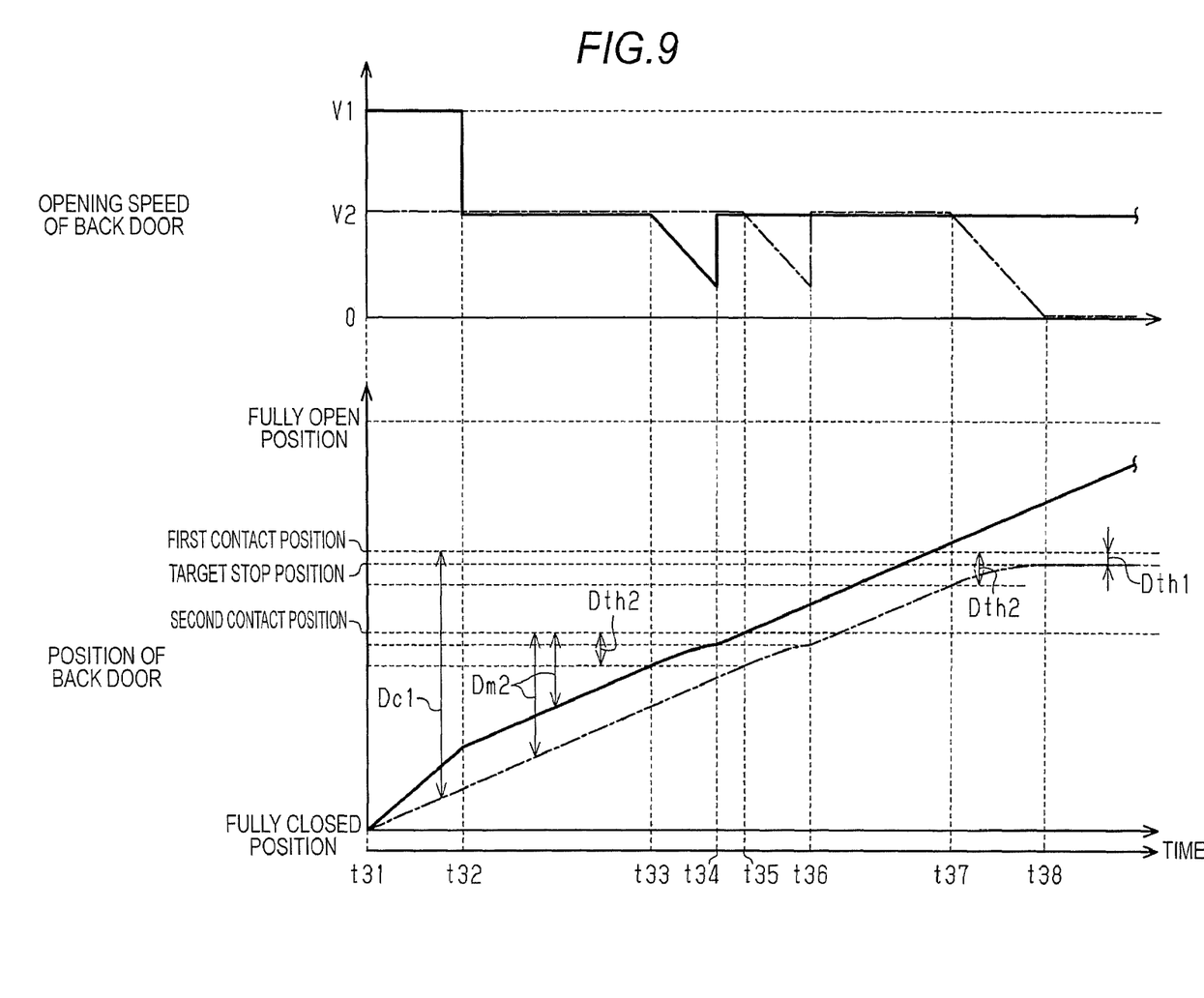
FIG. 9 is a timing chart illustrating the effect of the door control device.

A transition of the opening speed of the back door 13 and a transition of the position of the back door 13 when the back door 13 is opened from the fully closed position are to be described with reference to FIGS. 7 to 9. In FIGS. 7 to 9, a first contact position indicates a position at which the back door 13 is in contact with the first obstacle, and in FIGS. 8 and 9, a second contact position indicates a position at which the back door 13 is in contact with the second obstacle. In other words, the first contact position indicates a position of the first obstacle, and the second contact position indicates a position of the second obstacle.

In FIG. 7, a case where the obstacle 30 is not detected before or during the opening operation is indicated by solid lines, and a case where the first obstacle is detected before the opening operation but the second obstacle is not detected during the opening operation is indicated by dash-dot lines.

As indicated by the solid lines in FIG. 7, when the first obstacle is not detected at a first timing t11 at which the operation request of the back door 13 is input, the opening speed of the back door 13 is set to the first speed V1. Further, when the back door 13 starts to open at the first timing t11, the back door 13 reaches the fully open position at a second timing t12. Therefore, at the second timing t12, the back door 13 stops.

As indicated by the dash-dot lines in FIG. 7, when the first obstacle is detected at the first timing t11 at which the operation request of the back door 13 is input, the opening speed of the back door 13 is set to the second speed V2 lower than the first speed V1. Then, at the first timing t11, a position where the back door 13 is located in front of the first obstacle by the first determination distance Dth1 is set as the target stop position. Further, when the back door 13 starts to open from the first timing t11, the first estimation distance Dc1 is the second determination distance Dth2 at a third timing t13. Therefore, after the third timing t13, the opening speed of the back door 13 gradually decreases as the first estimation distance Dc1 decreases. When a fourth timing t14 at which the back door 13 reaches the target stop position is reached, the back door 13 stops in front of the first obstacle.

In FIG. 8, a case where the first obstacle is not detected before the opening operation while the second obstacle is detected during the opening operation is indicated by solid lines, and a case where the first obstacle is detected before the opening operation and the second obstacle is detected during the opening operation is indicated by dash-dot lines.

As indicated by the solid lines in FIG. 8, when the first obstacle is not detected at a first timing t21 at which the operation request of the back door 13 is input, the opening speed of the back door 13 is set to the first speed V1. Then, the back door 13 starts to open from the first timing t21. Further, when a second timing t22 at which the second obstacle is detected is reached, the opening speed of the back door 13 is set to the second speed V2. Subsequently, after a third timing t23 at which the second measurement distance Dm2 is less than the second determination distance Dth2, the opening speed of the back door 13 gradually decreases as the second measurement distance Dm2 decreases. When a fourth timing t24 at which the second measurement distance Dm2 is the first determination distance Dth1 is reached, the back door 13 stops at the position in front of the second obstacle.

As indicated by the dash-dot lines in FIG. 8, when the first obstacle is detected at the first timing t21 at which the operation request of the back door 13 is input, the opening speed of the back door 13 is set to the second speed V2 lower than the first speed V1. Further, at the first timing t21, the position where the back door 13 is located in front of the first obstacle by the first determination distance Dth1 is set to the target stop position. The back door 13 starts to open from the first timing t21. Further, even when the second timing t22 at which the second obstacle is detected is reached, the opening speed of the back door 13 is maintained at the second speed V2. After the fourth timing t24 at which the second measurement distance Dm2 is less than the second determination distance Dth2, the opening speed of the back door 13 gradually decreases as the second measurement distance Dm2 decreases. When a fifth timing t25 at which the second measurement distance Dm2 is the first determination distance Dth1 is reached, the back door 13 stops. That is, the back door 13 stops at the position in front of the second obstacle, instead of the target stop position in front of the first obstacle.

In FIG. 9, a case where the first obstacle is not detected before the opening operation while the second obstacle is temporarily detected during the opening operation is indicated by solid lines, and a case where the first obstacle is detected before the opening operation while the second obstacle is temporarily detected during the opening operation is indicated by dash-dot lines.

As indicated by the solid lines in FIG. 9, when the first obstacle is not detected at a first timing t31 at which the operation request of the back door 13 is input, the opening speed of the back door 13 is set to the first speed V1. Then, the back door 13 starts to open from the first timing t31. Further, when a second timing t32 at which the second obstacle is detected is reached, the opening speed of the back door 13 is set to the second speed V2. Subsequently, after a third timing t33 at which the second measurement distance Dm2 is less than the second determination distance Dth2, the opening speed of the back door 13 gradually decreases as the second measurement distance Dm2 decreases. When the second obstacle is no longer detected at a fourth timing t34, the opening speed of the back door 13 is increased to the second speed V2 after the fourth timing t34. In a period from the second timing t32 to the fourth timing t34, a case where the second obstacle is temporarily detected is, for example, a case where an object such as an animal or a ball temporarily passes through a detection area of the obstacle sensors SE.

After the fourth timing t34 at which the opening speed of the back door 13 is the second speed V2, the opening speed of the back door 13 is maintained at the second speed V2. That is, even when the second obstacle is not detected, the opening speed of the back door 13 is not increased to the first speed V1. Although not shown in FIG. 9, when the back door 13 reaches the fully open position, the back door 13 stops.

As indicated by the dash-dot lines in FIG. 9, when the first obstacle is detected at the first timing t31 at which the operation request of the back door 13 is input, the opening speed of the back door 13 is set to the second speed V2 lower than the first speed V1. Further, at the first timing t31, the position where the back door 13 is located in front of the first obstacle by the first determination distance Dth1 is set to the target stop position. Then, the back door 13 starts to open from the first timing t31. Further, even when the second timing t32 at which the second obstacle is detected is reached, the opening speed of the back door 13 is maintained at the second speed V2. Subsequently, after a fifth timing t35 at which the second measurement distance Dm2 is less than the second determination distance Dth2, the opening speed of the back door 13 gradually decreases as the second measurement distance Dm2 decreases. When the second obstacle is no longer detected at a sixth timing t36, the opening speed of the back door 13 is increased to the second speed V2 after the sixth timing t36. Further, the first estimation distance Dc1 is the second determination distance Dth2 at a seventh timing t37. Therefore, after the seventh timing t37, the opening speed of the back door 13 gradually decreases as the first estimation distance Dc1 decreases. When an eighth timing t38 at which the back door 13 reaches the target stop position is reached, the back door 13 stops at the position in front of the first obstacle.

At the fourth timing t34 of a timing chart shown in FIG. 9, the second measurement distance Dm2 from the back door 13 to the second obstacle is assumed to be longer than the first determination distance Dth1. Similarly, at the sixth timing t36 of the timing chart shown in FIG. 9, the second measurement distance Dm2 from the back door 13 to the second obstacle is assumed to be longer than the first determination distance Dth1.

Effects of this embodiment are to be described.

(1) As indicated by the solid lines in FIG. 8, when the second obstacle is detected during the opening operation of the back door 13 in a situation where the first obstacle is not detected when the operation request is input, the door control device 20 sets the opening speed of the back door 13 to the second speed V2 lower than the first speed V1. Specifically, at the second timing t22 in FIG. 8, the opening speed of the back door 13 is changed from the first speed V1 to the second speed V2. Therefore, during the opening operation of the back door 13, the door control device 20 can increase the number of times of detection of the obstacle sensors SE with respect to a unit movement amount of the back door 13, and shorten a braking distance after trying to stop the back door 13 in operation. Therefore, the door control device 20 can improve a positional accuracy when stopping the back door 13 in operation in front of the second obstacle.

(2) As shown in FIG. 8, when the back door 13 is close to the second obstacle, the door control device 20 gradually decreases the opening speed of the back door 13 from the second speed V2 as the distance from the back door 13 to the second obstacle decreases. Specifically, when indicated by the solid lines in FIG. 8, in a period from the third timing t23 to the fourth timing t24, the opening speed of the back door 13 gradually decreases as the second measurement distance Dm2 decreases. Further, when indicated by the dash-dot lines in FIG. 8, in a period from the fourth timing t24 to the fifth timing t25, the opening speed of the back door 13 gradually decreases as the second measurement distance Dm2 decreases. Therefore, the door control device 20 can further improve the positional accuracy when stopping the back door 13 in operation in front of the obstacle 30.

(3) As shown in FIG. 9, when the second obstacle is no longer detected during the operation of the back door 13, the door control device 20 increases the opening speed of the back door 13 which is set to the second speed V2 or less since the back door 13 is close to the second obstacle. Specifically, when indicated by the solid lines in FIG. 9, the opening speed of the back door 13 which is set to the second speed V2 or less in a period from the third timing t33 to the fourth timing t34 is increased at the fourth timing t34. In addition, when indicated by the dash-dot lines in FIG. 9, the opening speed of the back door 13 which is set to the second speed V2 or less in a period from the fifth timing t35 to the sixth timing t36 is increased at the sixth timing t36. Therefore, when the second obstacle is no longer present, the door control device 20 can promptly operate the back door 13 to a target position.

(4) As indicated by the solid lines in FIG. 9, after the fourth timing t34, the door control device 20 sets an upper limit of the opening speed of the back door 13 to the second speed V2. Therefore, the door control device 20 can prepare for a situation in which the second obstacle is detected again.

(5) As indicated by the dash-dot lines in FIG. 7, when the first obstacle is present around the back door 13, the door control device 20 sets the target stop position, which is a position close to the first obstacle, before the operation of the back door 13 is started. Therefore, even when the door control device 20 cannot detect the first obstacle during the operation of the back door 13, the back door 13 operates to the target stop position. Therefore, even when the first obstacle cannot be detected during the operation of the back door 13, the door control device 20 can stop the back door 13 in front of the first obstacle.

(6) When a distance from a position where the operation of the back door 13 is started to the obstacle 30 is short, the back door 13 moves only slightly even when the back door 13 is opened to close to the obstacle 30. That is, in this case, even when the back door 13 is opened, the user cannot load or unload the luggage with respect to the luggage compartment of the vehicle 10. In this regard, the door control device 20 restricts the opening operation of the back door 13 when the distance from the position where the opening operation of the back door 13 is started to the obstacle 30 is short. Specifically, the door control device 20 restricts the opening operation of the back door 13 when the first measurement distance Dm1 is less than the third determination distance Dth3. Therefore, the door control device 20 can restrict a meaningless opening operation of the back door 13.

(7) When the back door 13 does not operate regardless the user makes the operation request to the door control device 20, the user may feel uncomfortable that the back door 13 does not operate normally. In this regard, even when the distance from the back door 13 to the obstacle 30 is short, the door control device 20 releases the restraint of the back door 13 by the door lock device 14. Therefore, the door control device 20 can respond to the operation request of the user by releasing the restraint of the back door 13, and can notify the user that the back door 13 cannot be opened. Thus, the door control device 20 can prevent the user from feeling uncomfortable. Further, depending on an elastic modulus of a weather strip disposed between the door opening 11 and the back door 13, the back door 13 can be slightly moved while the restraint of the back door 13 is released by a restoring force of the weather strip.

(8) As indicated by the dash-dot lines in FIG. 8, even in a situation where the back door 13 is operated toward the target stop position, the door control device 20 stops the back door 13 in front of the second obstacle when the second obstacle is detected at a position in front of the target stop position. Therefore, the door control device 20 can prevent the back door 13 from coming into contact with the second obstacle even when the second obstacle appears during the operation of the back door 13.

This embodiment may be modified and implemented as follows. This embodiment and the following modifications can be implemented in combination with each other within a technically consistent range.

The back door 13 may be another opening and closing body driven by another opening and closing body drive device. For example, another opening and closing body may be a slide door or a swing door that opens and closes the door opening 11 formed on a side portion of the vehicle 10, or a sunroof movable panel that opens and closes a roof opening formed in a roof of the vehicle 10. In a case where another opening and closing body is the slide door, the door control device 20 may perform the above control in relation to the obstacle 30 that can come into contact with the slide door that is operated to close.

The door control device 20 may perform the above control when the back door 13 is not located at the fully closed position. For example, the door control device 20 may perform the above control when the operation request for opening the back door 13 is input in a situation where the back door 13 is disposed at a slightly open position from the fully closed position.

The door drive device 15 may not be the actuator that expands and contracts as long as the door drive device 15 can open and close the back door 13. For example, the door drive device 15 may be the actuator that applies a torque to a rotation shaft of the back door 13.

The obstacle sensors SE may use light or radio waves instead of the ultrasonic waves.

The obstacle sensors SE may be cameras. In this case, the cameras may be provided on the back door 13 or may be provided on the vehicle body 12. Even when the obstacle sensors SE are implemented by the cameras, the detection results of the obstacle sensors SE may not be normal during the opening operation of the back door 13. For example, images of the cameras may be disturbed due to that raindrops adheres to a surface of a camera lens or an amount of light incident on the cameras changes significantly during the opening operation of the back door 13. Therefore, even when the obstacle sensors SE are set as the cameras, an effect (5) of the above embodiment can be obtained.

The back door 13 may be provided with only one obstacle sensor SE. In this case, reflected waves of ultrasonic waves transmitted from one obstacle sensor SE may be received by the one obstacle sensor SE. The same may be applied to a case where the back door 13 is provided with a plurality of obstacle sensors SE.

The obstacle sensors SE may be disposed on the back door 13 so as to be arranged in a grid shape in both the width direction of the vehicle 10 and the up and down direction of the vehicle 10.

The map shown in FIG. 4 may be changed as appropriate. For example, when the distance from the back door 13 to the obstacle 30 is less than the second determination distance Dth2, the opening speed of the back door 13 may be changed stepwise according to the distance from the back door 13 to the obstacle 30, or the opening speed of the back door 13 may be changed nonlinearly according to the distance from the back door 13 to the obstacle 30. The same applies to the case where the distance from the back door 13 to the obstacle 30 is equal to or greater than the second determination distance Dth2.

The door control device 20 may keep the opening speed of the back door 13 constant regardless of the distance from the back door 13 to the obstacle 30. For example, the door control device 20 may set the opening speed of the back door 13 to the first speed V1 when the obstacle 30 is not detected, and may set the opening speed of the back door 13 to the second speed V2 when the obstacle 30 is detected.

When the second obstacle is no longer detected, the door control device 20 may not suddenly change the opening speed of the back door 13 to the second speed V2, but gradually increases the opening speed to the second speed V2 as time elapses.

When the second obstacle is no longer detected, the door control device 20 may increase the opening speed of the back door 13 to a speed higher than the second speed V2. For example, as indicated by the solid lines in FIG. 9, after the fourth timing t34, the opening speed of the back door 13 may be increased with the first speed V1 as an upper limit.

When the first measurement distance Dm1 is less than the third determination distance Dth3 (step S18: YES), the door control device 20 may issue an alarm sound together with the unlatch operation. The alarm sound in this case is an alarm sound intended to notify that the back door 13 cannot be opened since the distance from the back door 13 to the first obstacle is short.

When the first measurement distance Dm1 is less than the third determination distance Dth3 (step S18: YES), the door control device 20 may issue the alarm sound instead of the unlatch operation.

The fully open position of the back door 13 may not be a position of the back door 13 when the opening degree of the back door 13 is maximized. For example, the fully open position of the back door 13 may be a memory location set in advance by the user.

The opening speed of the back door 13 may be a rotation speed of the back door 13.

The door control device 20 includes one or more processors that operate according to a computer program (software), and one or more dedicated hardware circuits such as dedicated hardware (Application-Specific Integrated Circuit: ASIC) that executes at least a part of various processing, or a circuit including a combination thereof. The processor includes a CPU and a memory such as RAM and ROM, and the memory stores program codes or instructions configured to cause the CPU to execute the processing. The memory, that is a storage medium, includes any available medium that can be accessed by a general-purpose computer or a dedicated computer.

An opening and closing body control device for a vehicle includes a control unit configured to control an opening and closing body drive device driving an opening and closing body of a vehicle to open and close the opening and closing body based on an operation request; and a detection unit configured to detect an obstacle present around the opening and closing body based on a detection result of an obstacle sensor. The control unit is configured to set an operation speed of the opening and closing body to a first speed when the obstacle is not detected during an operation of the opening and closing body, and set the operation speed of the opening and closing body to a second speed or less, the second speed being lower than the first speed, and causes the opening and closing body to stop at a position where the opening and closing body is close to the obstacle, when the obstacle is detected during the operation of the opening and closing body.

The opening and closing body control device for a vehicle configured as described above sets the operation speed of the opening and closing body to the second speed, which is lower than the first speed, or less when the obstacle is detected during the operation of the opening and closing body. Therefore, the opening and closing body control device for a vehicle can increase the number of times of detection of the obstacle sensor with respect to a unit movement amount of the opening and closing body, and shorten a braking distance which is a distance the opening and closing body moves when the opening and closing body in operation is stopped until the opening and closing body is actually stopped. Therefore, the opening and closing body control device for a vehicle can improve the positional accuracy when stopping the opening and closing body in operation in front of the obstacle.

In the opening and closing body control device for a vehicle, it is preferable that, when a distance from the opening and closing body to the obstacle when the control unit stops the opening and closing body is set as a first determination distance, the control unit is configured to, in a situation where the obstacle is detected during the operation of the opening and closing body, set the operation speed of the opening and closing body to the second speed when the distance from the opening and closing body to the obstacle is equal to or greater than a second determination distance which is longer than the first determination distance, and decrease the operation speed of the opening and closing body as the distance decreases when the distance from the opening and closing body to the obstacle is less than the second determination distance.

When the opening and closing body is getting close to the obstacle, the opening and closing body control device for a vehicle configured as described above gradually decreases the operation speed of the opening and closing body from the second speed as a distance from the opening and closing body to the obstacle decreases. Therefore, the opening and closing body control device for a vehicle can further improve the positional accuracy when stopping the opening and closing body in operation in front of the obstacle.

In the opening and closing body control device for a vehicle, it is preferable that the control unit is configured to, in the situation where the obstacle is detected during the operation of the opening and closing body, increase the operation speed of the opening and closing body when the obstacle is no longer present, when the distance from the opening and closing body to the obstacle is less than the second determination distance.

The opening and closing body control device for a vehicle configured as described above increases the operation speed of the opening and closing body which is set to the second speed or less since the opening and closing body is close to the obstacle when the obstacle is not detected during the operation of the opening and closing body. Therefore, the opening and closing body control device for a vehicle can promptly operate the opening and closing body to a target position.

The opening and closing body control device for a vehicle can improve the positional accuracy when stopping the opening and closing body in operation in front of the obstacle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An opening and closing body control device for a vehicle, comprising:
    a control unit configured to control an opening and closing body drive device that drives an opening and closing body of a vehicle to open and close the opening and closing body based on an operation request; and
    a detection unit configured to detect an obstacle present around the opening and closing body based on a detection result of an obstacle sensor, wherein
    the control unit is configured to:
        set an operation speed of the opening and closing body to a first speed when the obstacle is not detected during an operation of the opening and closing body, and
        determine a first measurement distance from the opening and closing body to the obstacle when the obstacle is detected,
        set the operation speed of the opening and closing body to a second speed or less, the second speed being lower than the first speed, and causes the opening and closing body to stop at a position where the opening and closing body is equal to or less than a predetermined distance from the obstacle, when the obstacle is detected during the operation of the opening and closing body,
        restrict an opening operation of the opening and closing body when the first measurement distance is less than a predetermined restriction measurement distance, and
        control the drive device to unlatch a lock device for the opening and closing body when the obstacle is not detected by the detection unit, and control the drive device to unlatch the lock device when the obstacle is detected by the detection unit and the opening operation of the opening and closing body is restricted.

2. The opening and closing body control device for a vehicle according to claim 1, wherein
    when a distance from the opening and closing body to the obstacle when the control unit causes the opening and closing body to stop is set as the first determination distance,
    the control unit is configured to, in a situation where the obstacle is detected during the operation of the opening and closing body,
    set the operation speed of the opening and closing body to the second speed when the distance from the opening and closing body to the obstacle is equal to or greater than a second determination distance which is longer than the first determination distance, and
    decrease the operation speed of the opening and closing body as the distance decreases when the distance from the opening and closing body to the obstacle is less than the second determination distance.

3. The opening and closing body control device for a vehicle according to claim 2, wherein the control unit is configured to, in the situation where the obstacle is detected during the operation of the opening and closing body, increase the operation speed of the opening and closing body when the obstacle is no longer present, when the distance from the opening and closing body to the obstacle was less than the second determination distance.

4. The opening and closing body control device for a vehicle according to claim 1, wherein when the obstacle is present around the back door, the control unit is further configured to set a target stop position, which is a position equal to or less than a predetermined distance from the obstacle, before the operation of the back door is started.

5. The opening and closing body control device for a vehicle according to claim 3, wherein the control unit is further configured to set an upper limit of the operation speed to the second speed when increasing the operation speed of the opening and closing body.

* * * * *